March 4, 1952 — W. L. WHITSON — 2,587,672
AUTOMATIC REVOLVING CHAMBER ROCKET LAUNCHER
Filed Aug. 18, 1945 — 2 SHEETS—SHEET 1
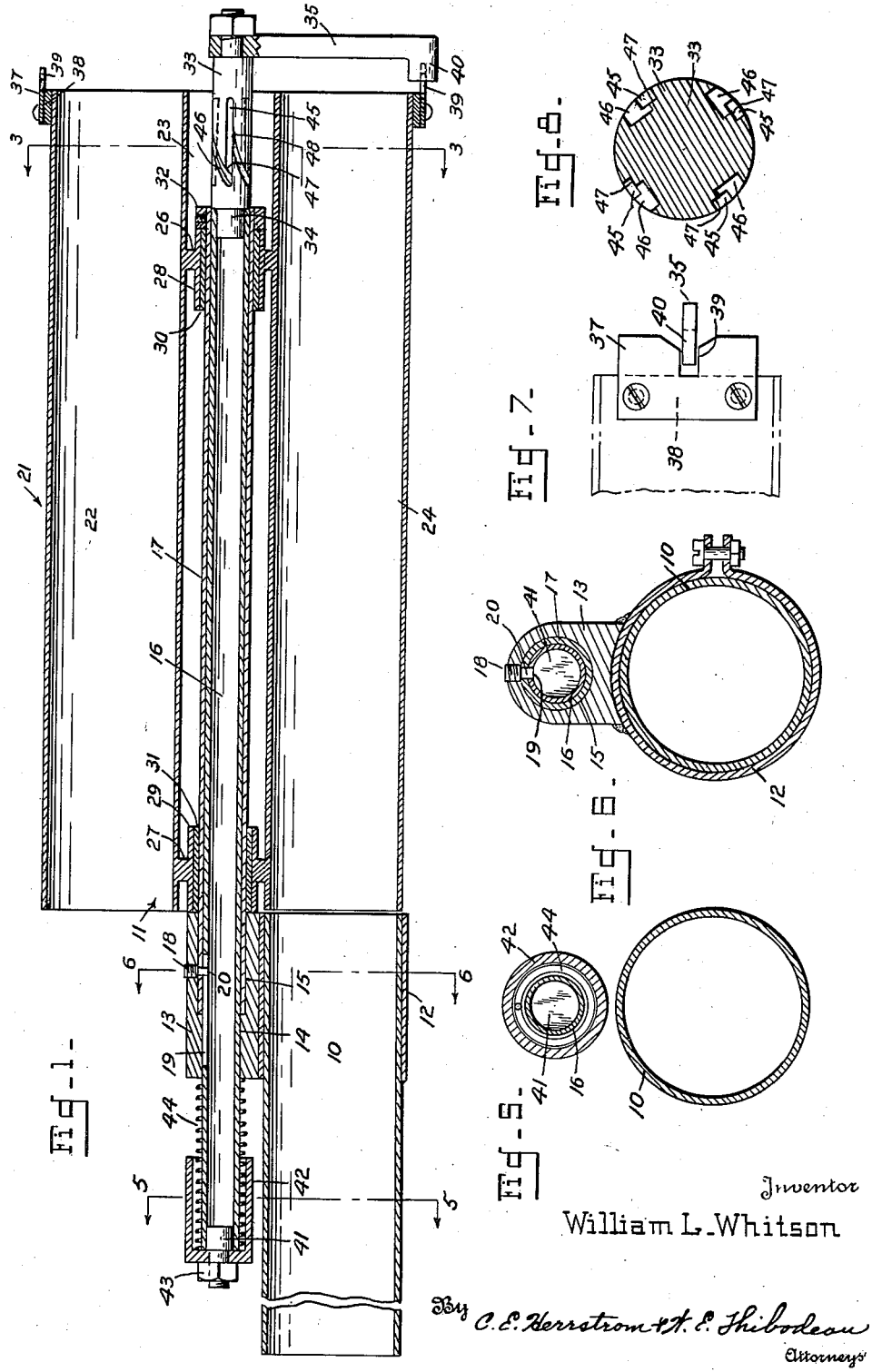
Inventor
William L. Whitson
By C. E. Herrstrom & H. E. Thibodeau
Attorneys March 4, 1952 W. L. WHITSON 2,587,672
AUTOMATIC REVOLVING CHAMBER ROCKET LAUNCHER
Filed Aug. 18, 1945 2 SHEETS—SHEET 2
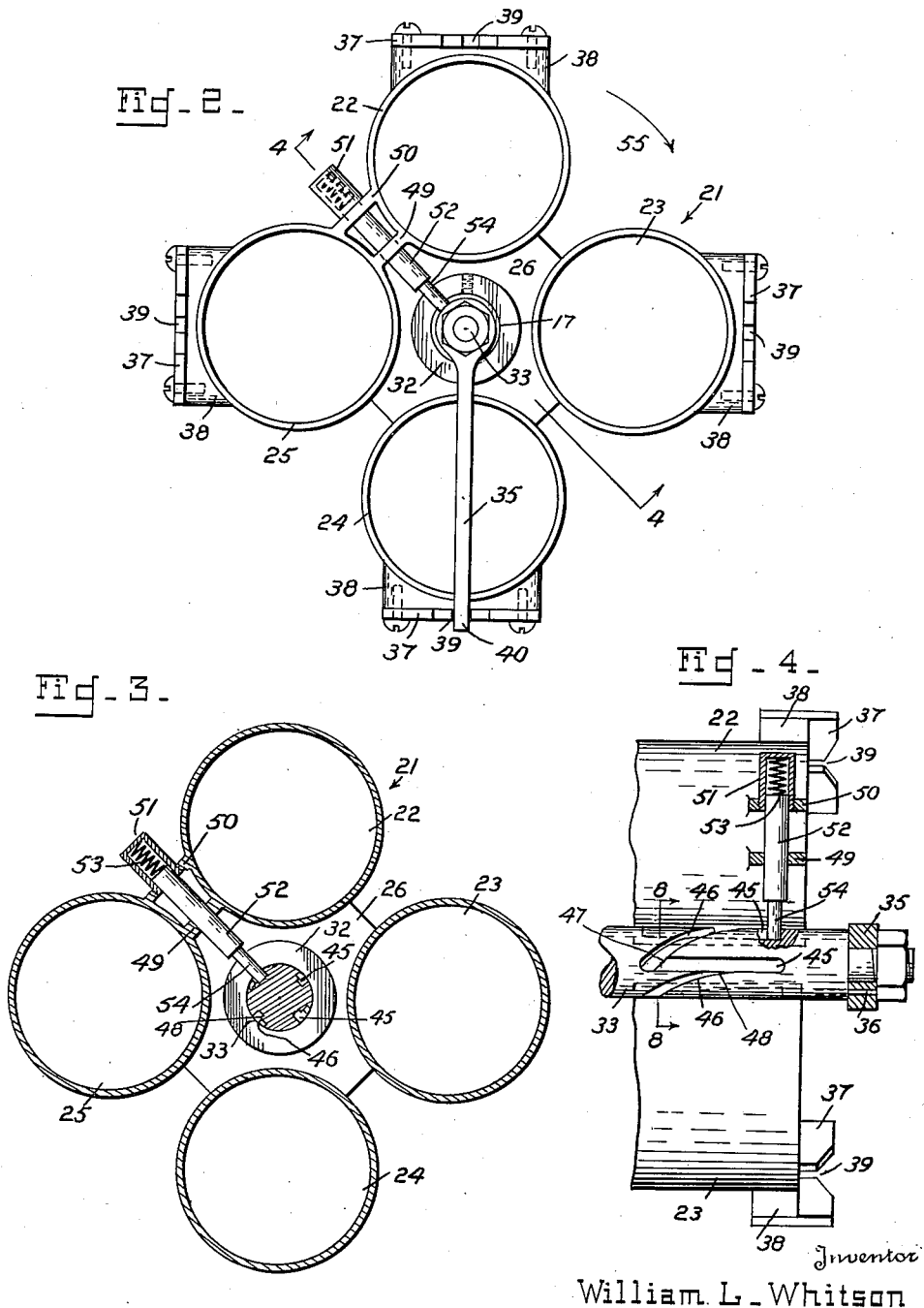
Inventor
William L. Whitson Patented Mar. 4, 1952

2,587,672

UNITED STATES PATENT OFFICE 2,587,672

AUTOMATIC REVOLVING CHAMBER ROCKET LAUNCHER

William L. Whitson, Takoma Park, Md.

Application August 18, 1945, Serial No. 611,436

8 Claims. (Cl. 89—1.7)

(Granted under the act of March 3, 1883, as amended April 30, 1928; 370 O. G. 757)

The invention described herein may be manufactured and used by or for the Government for governmental purposes without the payment to me of any royalty thereon.

This invention relates to improvements in rocket launchers, and more particularly to an automatic revolving loader capable of being attached to any conventional rocket launcher and employed in conjunction therewith for automatically loading a plurality of rockets to be fired.

More particularly, it is an aim of this invention to provide an attachment of very simple construction, capable of being utilized on rocket launchers now in use, or to be manufactured as a part thereof, and which is operated by the blast from a fired rocket for moving another rocket into a position ready to be fired.

Another object of the invention is to provide a mechanical means of very simple construction to convert the reciprocating motion, set up by the blast of the fired rocket and a recoil spring, into a rotary motion for moving the various cylinders of a revolver, containing the rockets, into a firing position.

Another object of the invention is to provide positive aligning means for holding each of the revolver cylinders, in turn, in axial alignment with the launcher tube.

Other objects and advantages of the invention will hereinafter become more fully apparent from the following description of the drawings, which illustrate a preferred embodiment of the invention, and wherein:

Figure 1 is a longitudinal, central vertical sectional view showing the automatic revolver mounted on a conventional rocket launcher tube;

Figure 2 is an end view in elevation looking toward the outer or rear end of the revolver;

Figure 3 is an enlarged cross sectional view taken along the line 3—3 of Fig. 1;

Figure 4 is a longitudinal sectional view taken along the line 4—4 of Fig. 2;

Figures 5 and 6 are cross sectional views taken along the lines 5—5 and 6—6, respectively, of Fig. 1;

Figure 7 is a fragmentary side elevational view of a portion of one of the revolver cylinders; and Figure 8 is an enlarged cross sectional view taken along the line 8—8 of Fig. 4.

Referring more particularly to the drawings, 10 designates generally a portion of a conventional rocket launcher illustrated merely to show the application of the automatic revolver, designated generally 11, comprising the invention and which is shown mounted thereon.

The automaic revolver 11 includes a split clamping ring 12 which is shown removably clamped to the launcher tube 10, adjacent its rear, loading end. However, it will be readily apparent that ring 12 can be fixed to the tube 10 in other ways when desired. Clamping ring 12 is provided with an integral upwardly projecting ear or lug 13 having a bore 14 extending therethrough and provided with an enlarged portion 15. A hollow shaft or tube 16 extends through the bore 14 and has a portion thereof journaled in the restricted portion of the said bore. The tube 17 is disposed on a portion of the hollow shaft 16 and has one end thereof seated in the enlarged bore portion 15 and retained therein by means of a removable set screw 18, which is mounted in the ear 13. The hollow shaft 16 has a longitudinal slot 19 and set screw 18 is provided with a restricted inner end 20 that slidably engages slot 19 to retain hollow shaft 16 against rotary motion relatively to the ear 13 but to permit a sliding motion of shaft 16 in the bore 14.

A revolver, designated generally 21, includes the four corresponding cylinders 22, 23, 24 and 25 which are rigidly connected together in spaced apart relationship by flanges 26 and 27. Flanges 26 and 27 are provided with centrally disposed bearings 28 and 29, respectively, which are rotatably mounted on bearing sleeves 30 and 31, respectively, which are in turn fixed to the tube 17. Bearing 29 and sleeve 31 have their outer ends bearing against ear 13 and an adjustable, removable retaining collar or lock washer 32 engages the opposite end of tube 17 and bears against the outer ends of bearing 28 and sleeve 30 to cooperate with ear 13 to releasably retain the revolver 21 against sliding movement relatively to the tube 17.

A shaft 33 has a restricted end 34 which is brazed or otherwise secured in the outer or rear end of hollow shaft 16. The opposite end of the shaft 33 extends beyond the outer, rear end of the revolver 21 and is provided with a threaded restricted end containing a nut by means of which an end of an arm 35 is removably connected to shaft 33. Arm 35 is keyed to shaft 33 by means of a pin 36, as seen in Fig. 4. Identical plates 37 are mounted on the corresponding outer portions of the cylinders 22, 23, 24 and 25 by means of supports 38 which are connected to or formed integral with said cylinders. Plates 37 have portions which project beyond the outer, rear ends of said cylinders and which are provided with corresponding tapered notches 39 for selectively receiving a lug or lateral extension 40, formed on the free end of the arm 35, for a purpose which will hereinafter become apparent.

The opposite, inner end of the shaft 16 projects through and beyond the ear 13 and has a restricted threaded extension 41 secured therein and projecting therefrom. A cup-shaped washer 42 is disposed on said extension 41 and has its annular wall disposed around and spaced outwardly from the last mentioned end of shaft 16. Washer 42 is removably retained in place by means of a nut 43 on extension 41. An expansion coil spring 44 is carried by the shaft 16, and has one end disposed in and bearing against the washer 42 and its opposite end bearing against the adjacent end of ear 13, for urging the shaft 16 forwardly, or to the left, as seen in Fig. 1. Movement of the shaft 16 under the impetus of spring 44 is limited by engagement of lug 40 with one of the notches 39.

Shaft 33 is provided with four longitudinally extending, corresponding grooves 45 which are equally spaced circumferentially. Shaft 33 is also provided with four corresponding semi-helical shaped grooves 46. Grooves 46 have corresponding ends which communicate with the inner ends of the grooves 45 and said grooves 46 extend from said inner ends of grooves 45 in a clockwise direction, looking toward the shaft 33 from its outer end or as seen in Figs. 2 and 3. The opposite ends of the grooves 46 each open into the next adjacent longitudinal groove 45 intermediate of its ends. The first mentioned ends of the grooves 46 are deeper than the ends of the grooves 45 into which they open to provide steps 47, as best seen in Fig. 4, and the opposite, last mentioned ends of the grooves 46 are shallower than the immediate portions of the grooves 45, with which they communicate, to provide steps 48, as best seen in Fig. 1.

A bearing 49 is formed or mounted between cylinders 22 and 25 and a flange 50 is similarly disposed between the same cylinders and outwardly of the bearing 49, as best seen in Fig. 3. A cup or socket 51 has its open end removably mounted in flange 50 and said cup 51 projects outwardly therefrom. A pin 52 slidably engages the bearing 49 and has its outer end slidably engaging in cup 51 and bearing against an expansion coil spring 53, which is contained in the cup 51, and which yieldably urges pin 52 radially inward to cause the opposite, restricted end 54 of pin 52 to yieldably engage one of the grooves 45 or 46. Obviously, pin 52 could be slidably mounted between any two of the cylinders.

As clearly illustrated in the drawings, the revolver 21 is located just behind the launcher tube 10 and is offset axially therefrom sufficiently so that when revolver 21 is rotated the cylinders 22, 23, 24 and 25 will successively move into and out of axial alignment with the launcher tube 10. Each of the cylinders 22, 23, 24 and 25 are intended to be loaded with a rocket, not shown, and to be held in place and fired by conventional means, forming no part of the invention, and which have therefore not been illustrated or described.

Assuming that the cylinders are thus loaded with rockets, not shown, and that the parts are in the positions as shown in the drawings, cylinder 24 is in an operative position and when the rocket, contained therein, is fired, in a conventional manner, the back blast from said rocket will impinge against arm 35 causing said arm to move rearwardly and away from the cylinder 24, thereby causing the extension 40 to move completely out of engagement with the notch 39 of the plate 37, associated with cylinder 24. Sufficient force will thus be exerted against arm 35 to cause it and the shaft 33 to move a distance substantially equivalent to the length of the groove 45, to thereby cause the pin 52 to ride in the groove 45, in which it is engaging from adjacent the outer end thereof to adjacent its inner end, at which time it will move off the step 47 of said groove 45 and into the deeper end of the groove 46, which communicates therewith. During this rearward and outward movement of the shaft 33, spring 44 will be compressed so that when the force of the blast from the exploding rocket has been expended, spring 44 will react upon the shaft 16, 33 to move it in the opposite direction or to the left, as viewed in Fig 1. The pin 52, being in engagement with one of the grooves 46 when the shaft 16, 33 is moved forward by spring 44, will be caused to ride the length of said groove 46 by the step 47 thereof which acts, in conjunction with the spring 53, to prevent the pin 52 from returning to the aforesaid mentioned longitudinal groove 45. As the shaft 16, 33 is prevented from rotating during its forward motion by the slot and pin connection 19, 20, the revolver 21 is therefore caused to rotate a quarter of a revolution while the pin 52 is moving the length of the aforesaid groove 46. At this point, the pin 52 will drop off the step 48 of the groove 46, in which said pin is riding, and into the next groove 45, intermediate of the ends thereof, so that the revolver 21 will have completed 90° rotation in a clockwise direction as indicated by the arrow 55, in Fig. 2, at this time. This will cause the cylinder 24 to have been moved out of axial alignment with the tube 10 and the cylinder 23 to have been moved into axial alignment with said tube. Likewise, it will be noted that when the pin 52 drops from the groove 46 into the last mentioned groove 45 the shaft 16, 33 will still not have completed its forward motion under the impetus of spring 44, so that lug 40 will still be sufficiently to the rear of the revolver 21 to be completely out of engagement with the plate 37 of the cylinder 23. The remainder of the forward motion of shaft 16, 33 is provided to enable the lug 40 to move into engagement with the central, inner portion of the plate 37 of cylinder 23 to thereby accurately and positively position the cylinder 23 in axial alignment with tube 10. Should the cylinder not be in perfect alignment with tube 10 as the lug 40 is moving into the notch 39 said lug will engage one of the tapered outer portions of the notch 39 so as to turn the revolver 21 sufficiently to position the inner or restricted portion of the notch 39 in alignment with the lug 40 to receive lug, as seen in Fig. 7. This aforedescribed operation will be repeated when the rocket, contained in cylinder 23, is fired and likewise for each succeeding cylinder of the revolver 21 until all the rockets have been fired.

The width of arm 35 can be varied as required to provide a sufficient impact surface for the rocket blast to drive the shaft 16, 33 the required distance to the rear. The number of rockets which may thus be fired automatically without reloading the weapon is limited only by the number of cylinders contained in the revolver 21, which may be increased or decreased as desired merely by increasing or decreasing the number of grooves 45 and 46 to correspond.

It is to be understood that only a preferred embodiment of the invention has been illustrated and described, and that the aforementioned and various other modifications and changes are contemplated and may obviously be resorted to, without departing from the spirit and scope of the invention as hereinafter defined by the appended claims.

I claim:

1. The combination with a rocket launcher tube, of a revolver loader for said launcher tube comprising a shaft secured to said launcher tube in laterally offset relation therewith and mounted for axial translation only, a revolver comprising a plurality of loader tubes mounted for rotation as a unit on said shaft to be successively aligned with said launcher tube, vane means for so translating said shaft in one direction in response to the back blast from a rocket in the loader tube aligned with said launcher tube, resilient means urging said shaft in the other direction, and means operated by movement of said shaft in said other direction to rotate said revolver to bring the next adjacent loader tube into alignment with said launcher tube.

2. The combination recited in claim 1, said vane means comprising an arm fixed to and projecting laterally from said shaft, said arm being disposed behind the loader tube aligned with said launcher tube.

3. The combination recited in claim 1, said last-mentioned means including a radial pin carried by said revolver and a member fixed with said shaft and having a cam slot engaged by said pin.

4. The combination recited in claim 1, said vane means comprising an arm fixed to and projecting laterally from said shaft, said vane means being disposed behind the loader tube in alignment with said launcher tube, a notched element secured to each respective loader tube, and a latch carried by said shaft and engageable in the notch in each said element in succession when said shaft is moved in said other direction by said resilient means, said latch being moved free of said elements in response to movement of said shaft by said vane means.

5. The combination recited in claim 3, said member having a plurality of circumferentially-spaced, longitudinally-extending grooves, one for each loader tube, and a helical groove connecting one end of each longitudinal groove with the central portion of the next adjacent longitudinal groove, each said helical groove being deeper than the longitudinal grooves at said one end, and shallower than said longitudinal grooves at the other end, means mounting said pin in said revolver for axial sliding movement, and means yieldingly urging one end of said pin into said grooves.

6. In an automatic rocket firing device, a launcher tube, a revolver comprising a plurality of loader tubes rigidly united for rotation as a unit, a shaft, means mounting said shaft for axial translation only on and with respect to said launcher tube, means journaling said loader tubes on said shaft for rotation in succession into alignment with said launcher tube, a pin slidably carried by said launcher radially of said shaft, said shaft having longitudinally disposed, circumferentially spaced grooves, there being helical grooves in said shaft, each helical groove connecting the forward end of one longitudinal groove with the central portion of the next adjacent longitudinal groove, each helical groove being deeper at its forward end than its communicating longitudinal groove, and shallower at its rearward end than its next adjacent communicating groove, spring means urging said pin with one end seated in said grooves, means responsive to firing of a rocket in said launcher tube for axially translating said shaft rearwardly, and means yieldingly urging said shaft forwardly.

7. In a rocket launcher, a launcher tube, a revolver comprising a plurality of loader tubes rigidly connected for movement as a unit, means mounting said revolver for movement to bring said loader tubes into aligned loading relation, in succession, with said launcher tube, and driving means powered by the discharge of a rocket from the loader tube aligned with said launcher tube, for rotating said revolver to bring the next succeeding loader tube into alignment with said launcher tube said driving means including vane means aligned with said launcher tube movable in one direction in response to the said discharge.

8. The combination recited in claim 6, and latch means carried by said launcher tube and revolver to positively latch said revolver in position with a loader tube aligned with said launcher tube, said latch means being released in response to operation of said driving means.

WILLIAM L. WHITSON.

REFERENCES CITED

The following references are of record in the file of this patent:

UNITED STATES PATENTS

| Number | Name | Date |
|---|---|---|
| 700,592 | Whiting | May 20, 1902 |
| 1,717,335 | Derschug | June 11, 1929 |
| 2,389,162 | McInnes | Nov. 20, 1945 |